United States Patent
Kupina et al.

(10) Patent No.: US 10,435,082 B1
(45) Date of Patent: Oct. 8, 2019

(54) MULTI-PANEL DECK SIDE EXTENDER SYSTEM FOR ORGANIZING AND INCREASING THE STORAGE CAPACITY OF A VEHICLE

(71) Applicant: Toyota Motor Engineering & Manufacturing North America, Inc., Plano, TX (US)

(72) Inventors: Robert K. Kupina, Ann Arbor, MI (US); Todd M. Bello, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/995,746

(22) Filed: Jun. 1, 2018

(51) Int. Cl.
| | | |
|---|---|---|
| *B62D 33/03* | (2006.01) | |
| *B62D 33/033* | (2006.01) | |
| *B60P 1/48* | (2006.01) | |
| *B60R 9/06* | (2006.01) | |
| *B60P 3/07* | (2006.01) | |
| *B60J 7/14* | (2006.01) | |

(52) U.S. Cl.
CPC .............. *B62D 33/03* (2013.01); *B60P 1/486* (2013.01); *B60R 9/06* (2013.01); *B62D 33/033* (2013.01); *B60J 7/141* (2013.01); *B60P 3/07* (2013.01)

(58) Field of Classification Search
CPC ....... B62D 33/03; B62D 33/033; B60P 1/486; B60J 7/141
USPC .... 296/32, 36, 26.06, 26.07, 100.06, 100.09
See application file for complete search history.

(56) References Cited

U.S. PATENT DOCUMENTS

| | | | | |
|---|---|---|---|---|
| 2,997,330 A | * | 8/1961 | Boultinghouse | B60R 9/00 296/10 |
| 3,768,858 A | * | 10/1973 | Boismier | B60J 7/041 296/100.09 |
| 3,841,690 A | | 10/1974 | Piercy | |
| 3,858,744 A | * | 1/1975 | Garvert | B60J 7/141 217/60 G |
| 3,861,737 A | * | 1/1975 | Kirkbride | B60J 7/141 296/100.18 |
| 4,531,775 A | * | 7/1985 | Beals | B62D 33/0273 108/12 |

(Continued)

FOREIGN PATENT DOCUMENTS

| | | | | |
|---|---|---|---|---|
| DE | 102007040198 B4 | 11/2010 | | |
| GB | 1117555 A | * | 6/1968 | B62D 33/033 |

*Primary Examiner* — Dennis H Pedder
(74) *Attorney, Agent, or Firm* — Dinsmore & Shohl LLP (57) ABSTRACT

A multi-panel deck side extender system including a deck rail assembly and a deck side extender assembly. The deck rail assembly includes a rail extending in a vehicle longitudinal direction and a bracket connected to the rail. The rail is secured to a sidewall of the pickup truck. The deck side extender assembly pivotally connects to the bracket. The deck side extender assembly is slidably displaceable in the vehicle longitudinal direction with respect to the rail. The deck side extender assembly is pivotally displaceable between a lowered position and a raised position. In the lowered position the deck side extender assembly is positioned below the upper surface sidewall in a vehicle vertical direction and adjacent the interior surface of the sidewall in a vehicle lateral direction. In the raised position the deck side extender assembly is positioned above the upper surface of the sidewall in the vehicle vertical direction.

20 Claims, 9 Drawing Sheets

(56) References Cited

U.S. PATENT DOCUMENTS

| | | | | |
|---|---|---|---|---|
| 4,585,264 A * | 4/1986 | Miller | ............... | B62D 33/023 |
| | | | | 105/379 |
| 6,068,319 A | 5/2000 | O'Brien | | |
| 6,106,050 A * | 8/2000 | McLeod | ............ | B62D 33/0273 |
| | | | | 296/100.06 |
| 6,607,229 B1 * | 8/2003 | McIntosh | ............... | B60J 7/1621 |
| | | | | 296/100.07 |
| 6,663,160 B2 * | 12/2003 | Yarbrough | ............... | B60J 7/141 |
| | | | | 296/100.01 |
| 6,783,169 B1 * | 8/2004 | Marx | ............... | B60J 7/041 |
| | | | | 296/100.03 |
| 6,799,784 B2 * | 10/2004 | Rios | ............... | B60J 7/141 |
| | | | | 296/100.07 |
| 6,902,222 B2 * | 6/2005 | Nykiel | ............... | B60J 7/10 |
| | | | | 296/100.02 |
| 7,878,568 B2 * | 2/2011 | Wu | ............... | B60R 9/00 |
| | | | | 224/405 |
| 8,052,019 B2 | 11/2011 | Plavetich | | |
| 8,636,182 B1 * | 1/2014 | Gordon | ............... | B60R 9/00 |
| | | | | 224/282 |
| 8,857,880 B2 | 10/2014 | Kalergis et al. | | |
| 8,960,765 B2 | 2/2015 | Facchinello et al. | | |
| 9,475,371 B2 * | 10/2016 | LaBiche | ............... | B60J 7/141 |
| 9,481,315 B1 | 11/2016 | Gordon | | |
| 9,540,050 B2 * | 1/2017 | Miller | ............... | B60J 7/141 |
| 2002/0149219 A1 * | 10/2002 | Rios | ............... | B60J 7/141 |
| | | | | 296/26.06 |
| 2004/0026948 A1 * | 2/2004 | Novajovsky | ............... | B60J 7/04 |
| | | | | 296/26.08 |
| 2007/0108801 A1 | 5/2007 | Huotari et al. | | |
| 2010/0187849 A1 * | 7/2010 | Wu | ............... | B60R 9/00 |
| | | | | 296/26.06 |
| 2017/0043699 A1 * | 2/2017 | Gordon | ............... | B60R 9/00 |

* cited by examiner

MULTI-PANEL DECK SIDE EXTENDER SYSTEM FOR ORGANIZING AND INCREASING THE STORAGE CAPACITY OF A VEHICLE

TECHNICAL FIELD

The present specification generally relates to systems and methods for organizing and increasing the storage capacity of cargo areas of vehicles and, more specifically, to multi-panel deck side extender systems for organizing and increasing the storage capacity of a vehicle.

BACKGROUND

Vehicles may have one or more areas for storing items and equipment. For example, pickup trucks may include a truck bed that may be surrounded by sidewalls and/or a tail gate. The sidewalls and/or tailgate of the pickup truck define a storage area for storing various items. Truck bed height extensions, or hungry boards, are currently known and used to extend a height of sidewalls of the truck bed to increase the storage capacity. The existing truck bed extensions are secured to the sidewalls of the truck bed at fixed points. The connection of the existing truck bed extensions at fixed points to the sidewalls of the truck bed prevents the existing truck bed extensions from being moved in a vehicle longitudinal direction with respect to the sidewalls of the truck bed.

Accordingly, a need exists for multi-panel deck side extender systems for organizing and increasing the storage capacity of a vehicle that are moveable in the vehicle longitudinal direction with respect to the sidewalls of the truck bed.

SUMMARY

In one embodiment, a multi-panel deck side extender system for a pickup truck having a truck bed that includes a floor and a pair of spaced apart sidewalls, each of the pair of spaced apart sidewalls includes an upper surface, an exterior surface and an opposite interior surface, the multi-panel deck side extender system including a deck rail assembly having a pair of rails that extend in a vehicle longitudinal direction and at least one bracket slidably connected to each rail of the pair of rails, each of the pair of rails are secured to the interior surfaces of the pair of sidewalls, and a pair of deck side extender assemblies, each of the pair of deck side extender assemblies pivotally connected to the at least one bracket such that each of the pair of deck side extender assemblies is slidably displaceable in the vehicle longitudinal direction with respect to the pair of rails, each of the pair of deck side extender assemblies are pivotally displaceable about the at least one bracket between a lowered position and a raised position, in the lowered position the pair of deck side extender assemblies are positioned below the upper surfaces of the pair of sidewalls, in a vehicle vertical direction and adjacent the interior surfaces of the pair of sidewalls in a vehicle lateral direction, and in the raised position the pair of deck side extender assemblies are positioned above the upper surfaces of the pair of sidewalls in the vehicle vertical direction.

In another embodiment, a truck bed deck side extender assembly includes a truck bed that includes a floor and a pair of spaced apart sidewalls, each of the pair of spaced apart sidewalls includes an upper surface, an exterior surface and an opposite interior surface, a deck rail assembly having a pair of rails that extend in a vehicle longitudinal direction and at least one bracket slidably connected to each of the pair of rails, each of the pair of rails are secured to the interior surfaces of the pair of sidewalls, and a pair of deck side extender assemblies, each of the pair of deck side extender assemblies pivotally connected to the at least one bracket such that each of the pair of deck side extender assemblies is slidably displaceable in the vehicle longitudinal direction with respect to the pair of rails, each of the pair of deck side extender assemblies includes a plurality of hingedly connected panels that are configured to articulate individually, each of the pair of deck side extender assemblies are pivotally displaceable about the at least one bracket between a lowered position and a raised position, in the lowered position the plurality of panels are positioned below the upper surface of the pair of sidewalls, in a vehicle vertical direction and adjacent the interior surfaces of the pair of sidewalls in a vehicle lateral direction, and in the raised position the plurality of panels are positioned above the upper surfaces of the pair of sidewalls in the vehicle vertical direction.

In yet another embodiment, a method of increasing the storage capacity of a truck bed of a pickup truck includes providing a truck bed that includes a floor and a pair of spaced apart sidewalls, each of the pair of spaced apart sidewalls including an upper surface, an exterior surface and an opposite interior surface, providing a deck rail assembly having a pair of rails that extend in a vehicle longitudinal direction and at least one bracket slidably connected to each of the pair of rails, each of the pair of rails are secured to the interior surfaces of the pair of sidewalls, providing a pair of deck side extender assemblies, each of the pair of deck side extender assemblies pivotally connected to the at least one bracket such that each of the pair of deck side extender assemblies is slidably displaceable in the vehicle longitudinal direction with respect to the pair of rails, each of the pair of deck side extender assemblies including a plurality of hingedly connected panels that are configured to articulate individually, each of the pair of deck side extender assemblies are pivotally displaceable about the at least one bracket between a lowered position and a raised position, in the lowered position the plurality of panels are positioned below the upper surface of the pair of sidewalls, in a vehicle vertical direction and adjacent the interior surfaces of the pair of sidewalls in a vehicle lateral direction, and in the raised position the plurality of panels are positioned above the upper surfaces of the pair of sidewalls in the vehicle vertical direction, and storing one or more items on one or more of each of the pair of deck side extender assemblies.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
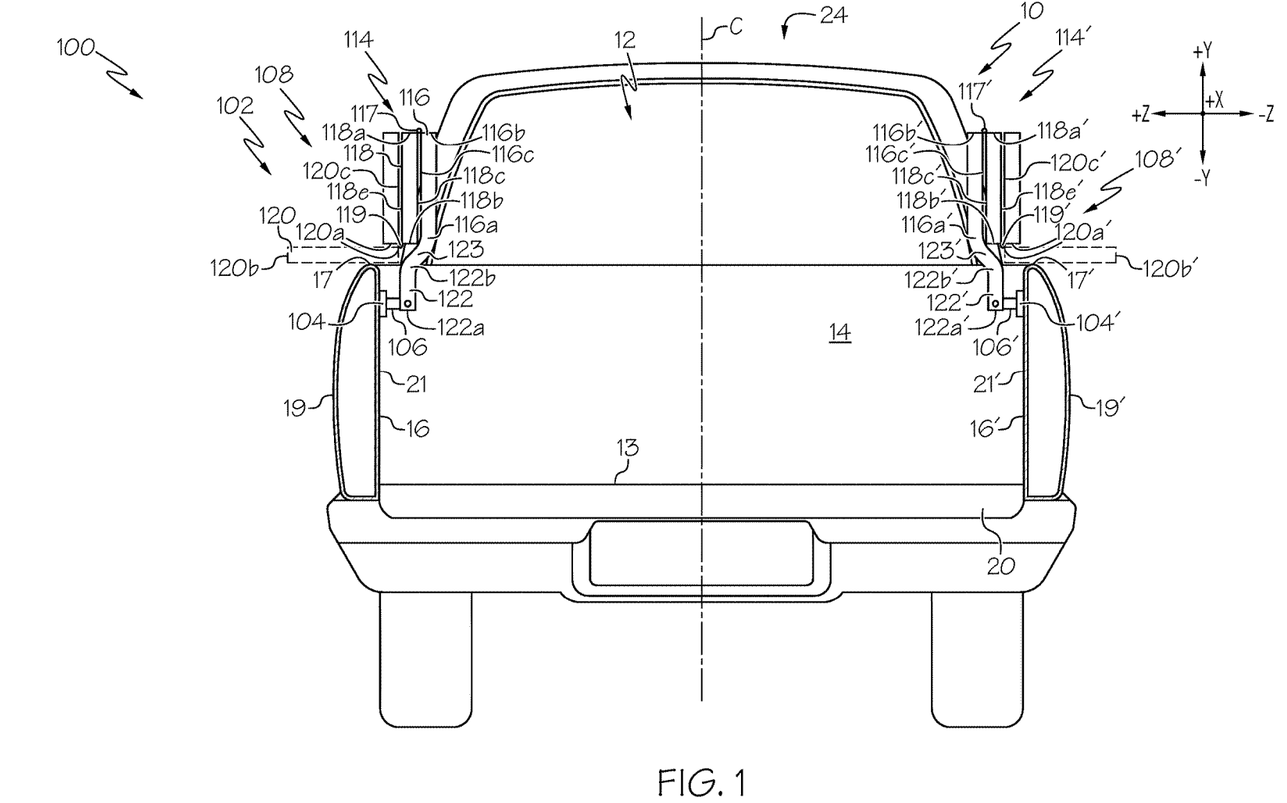
FIG. 1 schematically depicts a rear view of a truck bed having a multi-panel deck side extender system that includes a deck rail assembly and a pair of deck side extender assemblies in a raised position, according to one or more embodiments shown and described herein.

FIG. 1 generally depicts one embodiment of a pickup truck including a multi-panel deck side extender system. The multi-panel deck side extender system may hingedly couple to the vehicle at a deck rail assembly on opposite interior surfaces of a first sidewall and a second sidewall of a truck bed of the pickup truck. The multi-panel deck side extender system may be configured to rotate about a bracket between various positions providing a user of the vehicle greater access, organization, and size of storage in the truck bed. Various embodiments of the multi-panel deck side extender system will be described in greater detail herein.

As used herein, the term "vehicle longitudinal direction" refers to the forward-rearward direction of the pickup truck (i.e., in the +/− vehicle X direction depicted in FIG. 1). The term "vehicle vertical direction" refers to the upward-downward direction of the pickup truck (i.e., in the +/− vehicle Y-direction depicted in FIG. 1), and is traverse to the vehicle longitudinal direction. The term "vehicle lateral direction" refers to the cross-pickup truck direction (i.e., in the +/− vehicle Z direction depicted in FIG. 1), and is transverse to the vehicle longitudinal direction. As used herein, "upper" and "above" are defined as the positive Y direction of the coordinate axis shown in the drawings. "Lower" and "below" are defined as the negative Y direction of the coordinate axis shown in the drawings.

Referring to FIG. 1, the terms "outboard" or "outward" as used herein refers to the relative location of a component in direction with respect to a pickup truck centerline C. The term "inboard" or "inward" as used herein refers to the relative location of a component in direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline C when evaluating components positioned along opposite sides of the pickup truck.

Referring more specifically to FIG. 1, a pickup truck 10 including a truck bed 12 including a multi-panel deck side extender system 100 is depicted. It is to be understood that, while the particular embodiment depicted in FIG. 1 is a pickup truck, the principles of operation and embodiments described herein could be used on other body styles of vehicles. For example, the assembly and components described herein could be applied to a van or a sport utility vehicle (SUV). As shown in FIG. 1, portions of the pickup truck 10 on a first side of the vehicle may be substantially mirrored across the vehicle centerline C on a second side of the vehicle, however, it is contemplated that embodiments may include the pickup truck 10 with a multi-panel deck side extender system 100 on only one side of the pickup truck 10. The pickup truck 10 may further include a cabin 24 positioned forward of the truck bed 12 in the vehicle longitudinal direction. One or more vehicle users, such as a driver and/or passengers of the pickup truck 10, may sit in the cabin 24. For example, one or more users may sit in the cabin 24 while the pickup truck 10 is driving from one location to another.

The truck bed 12 may include a floor 13 and a pair of spaced apart sidewalls including a first sidewall 16 and a second sidewall 16'. The truck bed 12 may further include a front wall 14 and a tailgate 20. The front wall 14, the first sidewall 16, and the second sidewall may be substantially fixed, extending upward above the floor 13. Each of the sidewalls of the pair of spaced apart sidewalls 16, 16' may include an upper surface 17, 17' an exterior surface 19, 19' and an opposite interior surface 21, 21'.

The tailgate 20 may be pivotable between a closed position and an open position, enabling a user to selectively open and close the tailgate 20. As depicted in FIG. 1, the tailgate 20 is in the open position.

Figure 4:
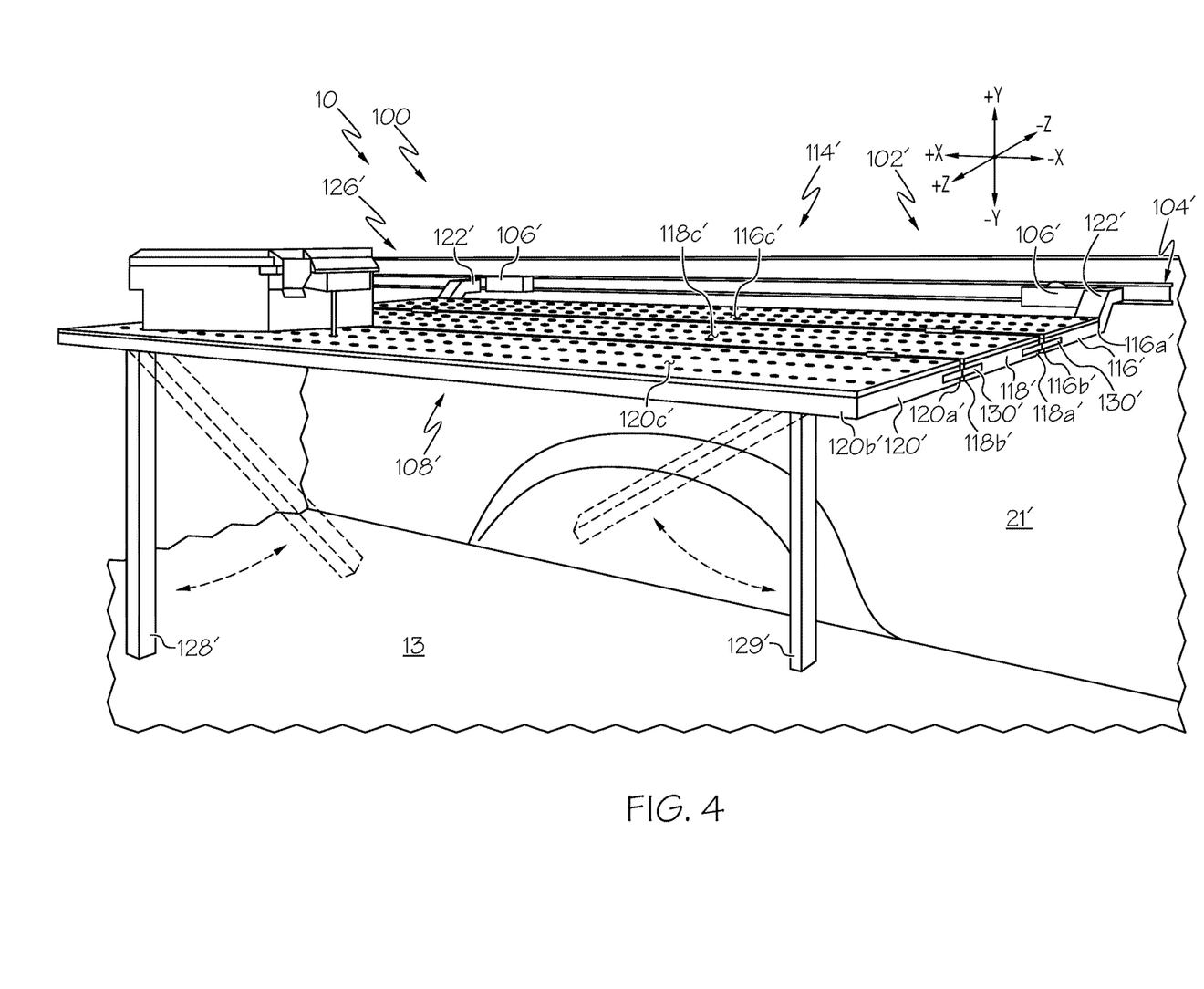
FIG. 4 schematically depicts a partial perspective view of one side of the truck bed of FIG. 1 with one of the pair of deck side extender assemblies in the intermediate position, according to one or more embodiments shown and described herein.

Referring to both FIGS. 1 and 4, the multi-panel deck side extender system 100 may include a deck rail assembly 102 that includes a pair of rails 104, 104' that extend in the vehicle longitudinal direction. For the purpose of ease of illustration, while only one side of the pickup truck 10 is shown in FIG. 4, and only an opposite side of the pickup truck 10 is shown in FIGS. 5-9, it is to be understood that the features shown and described on the left side of the pickup truck 10 are mirrored on the right side of the pickup truck 10.

The deck rail assembly 102 includes at least one bracket 106, 106' slidably connected to each of the pair of rails 104, 104'. Each rail 104, 104' may be secured to one of the interior surfaces 21, 21' of the pair of spaced apart sidewalls 16, 16'.

The pickup truck 10 may further include a first deck side extender assembly 108, and a second deck side extender assembly 108' that make up a pair of deck side extender assemblies 108, 108'. Each deck side extender assembly 108, 108' may pivotally connect to the bracket 106, 106' by extension arms 122, 122' such that each deck side extender assembly 108, 108' is slidably displaceable in the vehicle longitudinal direction with respect to each rail 104, 104' of the pair of rails. As will be discussed in greater detail below, each deck side extender assembly 108, 108' may be pivotally displaceable about the bracket 106, 106' between a lowered position, an intermediate position, and a raised position. As depicted in FIG. 1, the deck side extender assembly is in a raised position.

Still referring to FIGS. 1 and 4, each of the deck side extender assembly 108, 108' may include a plurality of hingedly connected panels 114, 114'. The plurality of hingedly connected panels 114, 114' may include a first panel 116, 116' a second panel 118, 118' and a third panel 120, 120'. The first panel 116, 116' and the second panel 118, 118' may each include a proximal edge 116a/116a', 118a/118a' and a distal edge 116b/116b', 118b/118b'. A first end 122a, 122a' of the extension arm 122, 122' may be pivotally connected to the bracket 106, 106'. A second end 122b, 122b' of the extension arm 122, 122' may be connected to the proximal edge 116a/116a' of the first panel 116, 116'. The distal edge 116b, 116b' of the first panel 116, 116' may be hingedly connected to the proximal edge 118a, 118a' of the second panel 118, 118' at a first hinge 117, 117' such that the second panel 118, 118' may articulate independently of the first panel 116, 116'.

In some embodiments, the plurality of hingedly connected panels 114, 114' may include a third panel 120, 120'. The third panel 120, 120' may include a proximal edge 120a, 120a' and a distal edge 120b, 120b'. The proximal edge 120a, 120a' of the third panel 120, 120' may hingedly connect to the distal edge 118b, 118b' of the second panel 118, 118' at a second hinge 119, 119' such that the third panel 120, 120' is independently articulable with respect to the second panel 118, 118'. Each first hinge 117, 117' and each second hinge 119, 119' may be one or more hinges.

Each panel of the plurality of hingedly connected panels 114, 114' may be configured to articulate individually from the other panels of the plurality of hingedly connected panels 114, 114'. That is, the second panel 118, 118' may pivot about the first hinge 117, 117' coupled between the proximal edge 118a, 118a' of the second panel 118, 118' and the distal edge 116b, 116b' of the first panel 116, 116' as will be described in greater detail herein. The second panel 118, 118' may pivot about the first hinge 117, 117' at least between a position in which the second panel 118, 118' is substantially beside the first panel 116, 116', for example in arrangements where the deck side extender assembly 108, 108' is stacked, or where the second panel 118, 118' and the first panel 116, 116' form a substantially flat plane, as will be described in greater detail herein. The third panel 120, 120' may pivot about the second hinge 119, 119' with respect to the second panel 118, 118' similarly to the pivot of the second panel about the first hinge 117, 117'. The third panel 120, 120' may pivot at least from a position where it is substantially next to and parallel with the second panel 118, 118', to a position in which the third panel 120, 120' is substantially extended from the second panel 118, 118'.

In embodiments, the three panels 116/116', 118/118', 120/120' may form a stacked configuration, as shown in FIG. 1, in which the outer surface 116c, 116c' of the first panel 116, 116' abuts an outer surface 118c, 118c' of the second panel 118, 118' and an inner surface 118e, 118e' of the second panel 118, 118' abuts an inner surface 120c, 120c' of the third panel 120, 120'. The abutment of the inner and outer surfaces may create auxiliary storage compartments as will be discussed in greater detail herein. The plurality of hingedly connected panels 114, 114' may be moved from the raised position to the intermediate position to the lowered position and vice-a-versa in the stacked position.

Still referring to FIG. 1, the plurality of hingedly connected panels 114, 114' may include the extension arms 122, 122'. The extension arms 122, 122' may comprise a bend 123, 123'. The bend 123, 123' may provide clearance such that when the deck side extender assembly 108, 108' is in a particular position, the extension arms 122 do not interfere with other portions of the multi-panel deck side extender system 100 or the pickup truck 10. With the plurality of hingedly connected panels 114, 114' in the intermediate or lowered position, a tonneau cover could fit over the truck bed 12 without interfering with the motion of the plurality of hingedly connected panels 114, 114'.

In the particular embodiment shown in FIGS. 1 and 4, the deck side extender assembly 108, 108', includes three panels but embodiments are not limited to this configuration. It is contemplated that embodiments may include two, four, five, or more panels.

Figure 2:
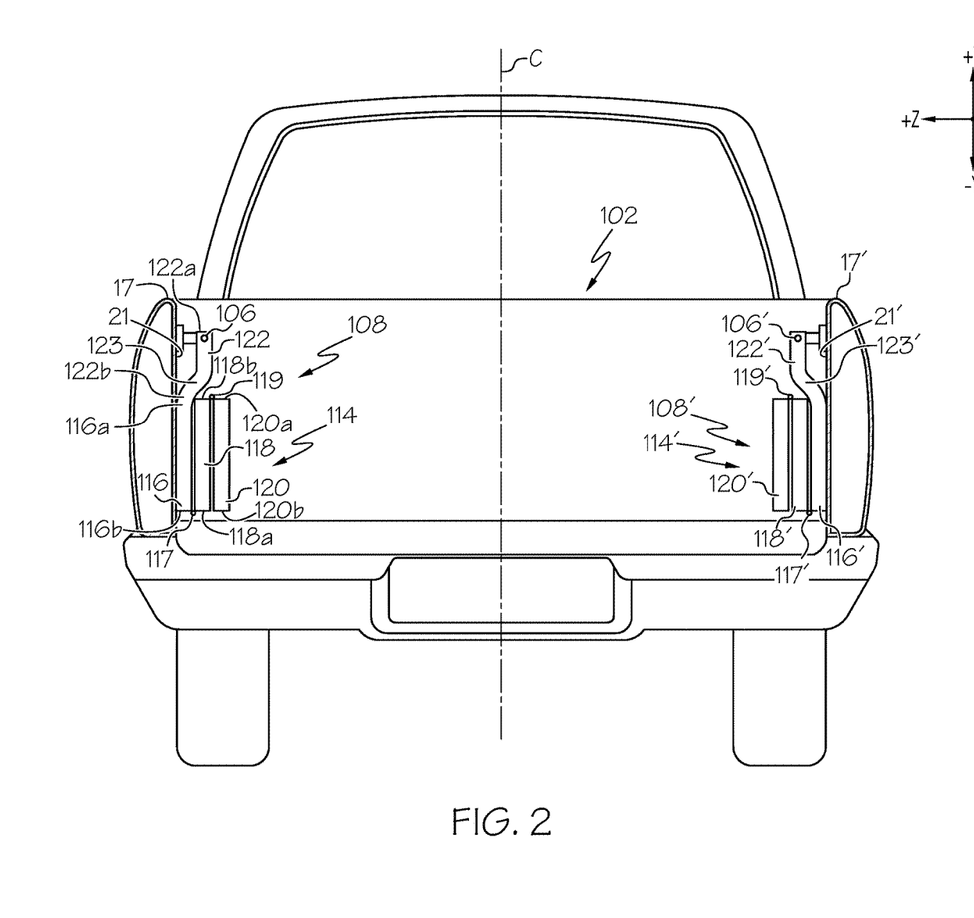
FIG. 2 schematically depicts a rear view of the truck bed of FIG. 1 with the pair of deck side extender assemblies in a lowered position, according to one or more embodiments shown and described herein.

FIG. 2 shows the deck side extender assembly 108, 108' in the lowered position. In the lowered position, the pair of deck side extender assemblies 108, 108' may be positioned below the upper surface 17, 17' of the pair of sidewalls 16, 16' in the vehicle vertical direction. In the lowered position, the pair of deck side extender assemblies 108, 108' may be adjacent the interior surfaces 21, 21' of the pair of sidewalls 16, 16' in the vehicle lateral direction. In the raised position, the pair of deck side extender assemblies 108, 108' may be positioned above the upper surfaces 17, 17' of the pair of sidewalls 16, 16' in the vehicle vertical direction. The deck side extender assemblies 108, 108' may be moved in the stacked configuration between the raised and lowered positions. In the lowered position, the deck side extender assemblies 108, 108' may remain in the stacked configuration increasing the storage capacity of the truck bed 12.

Figure 3:
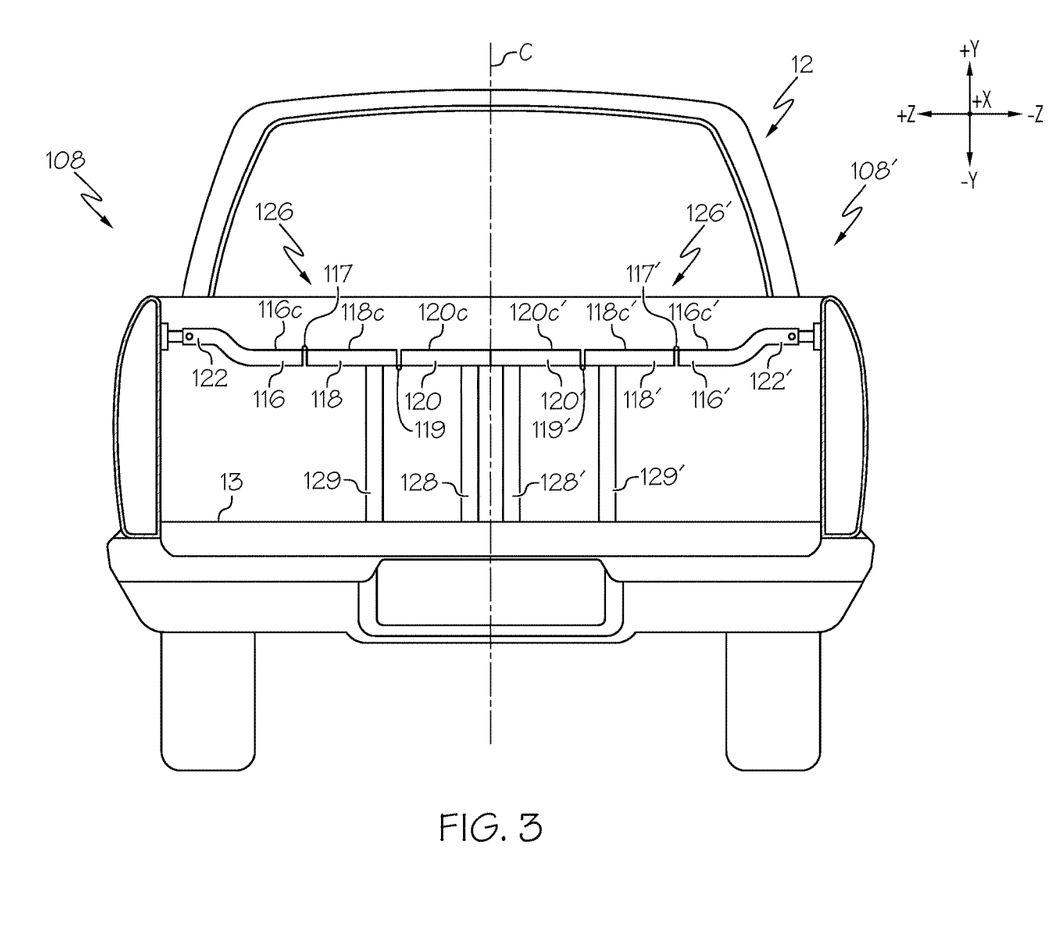
FIG. 3 schematically depicts a rear view of the truck bed of FIG. 1 with the pair of deck side extender assemblies in an intermediate position, according to one or more embodiments shown and described herein.

Referring now to FIG. 3, in some embodiments, each deck side extender assembly 108, 108' of the multi-panel deck side extender system 100 may be pivotably displaceable about the bracket 106, 106' to the intermediate position between the raised and the lowered positions. As shown in FIG. 3, in some embodiments of the pickup truck 10, the first deck side extender assembly 108 and the second deck side extender assembly 108' may extend across an entire width of the truck bed 12. In some embodiments, the first deck side extender assembly 108 and the second deck side extender assembly 108' may meet substantially at the vehicle centerline C. The first deck side extender assembly 108 and the second deck side extender assembly 108' may be supported in the intermediate position by a first leg 128, 128' and a second leg 129, 129' that will be described in greater detail herein. In the intermediate position, the outer surface 116c, 116c' of the first panel 116, 116', the outer surface 118c, 118c' of the second panel 118, 118', and the outer surface 120c, 120c' of the third panel 120, 120' may extend in a substantially flat plane 126, 126' in the vehicle lateral direction and in the vehicle longitudinal direction.

Referring to FIGS. 3 and 4, in some embodiments, at least one of the first panel 116, 116', the second panel 118, 118', and the third panel 120, 120' may include a leg, such as the first leg 128, 128' and the second leg 129, 129', that extends between the substantially flat plane 126 and the floor 13 to support the first panel 116, 116' the second panel 118, 118', and the third panel 120, 120' in the intermediate position.

As shown in FIG. 4, the first leg 128' and the second leg 129' (and first leg 128 and second leg 129 of FIG. 3) may be moveable between an unfolded position and a folded position. FIG. 4 shows the legs 128', 129' being moved from the unfolded position (solid black lines) to the folded position. The legs 128', 129' may fold downward to support the panels of the multi-panel deck side extender system 100.

Figure 5:
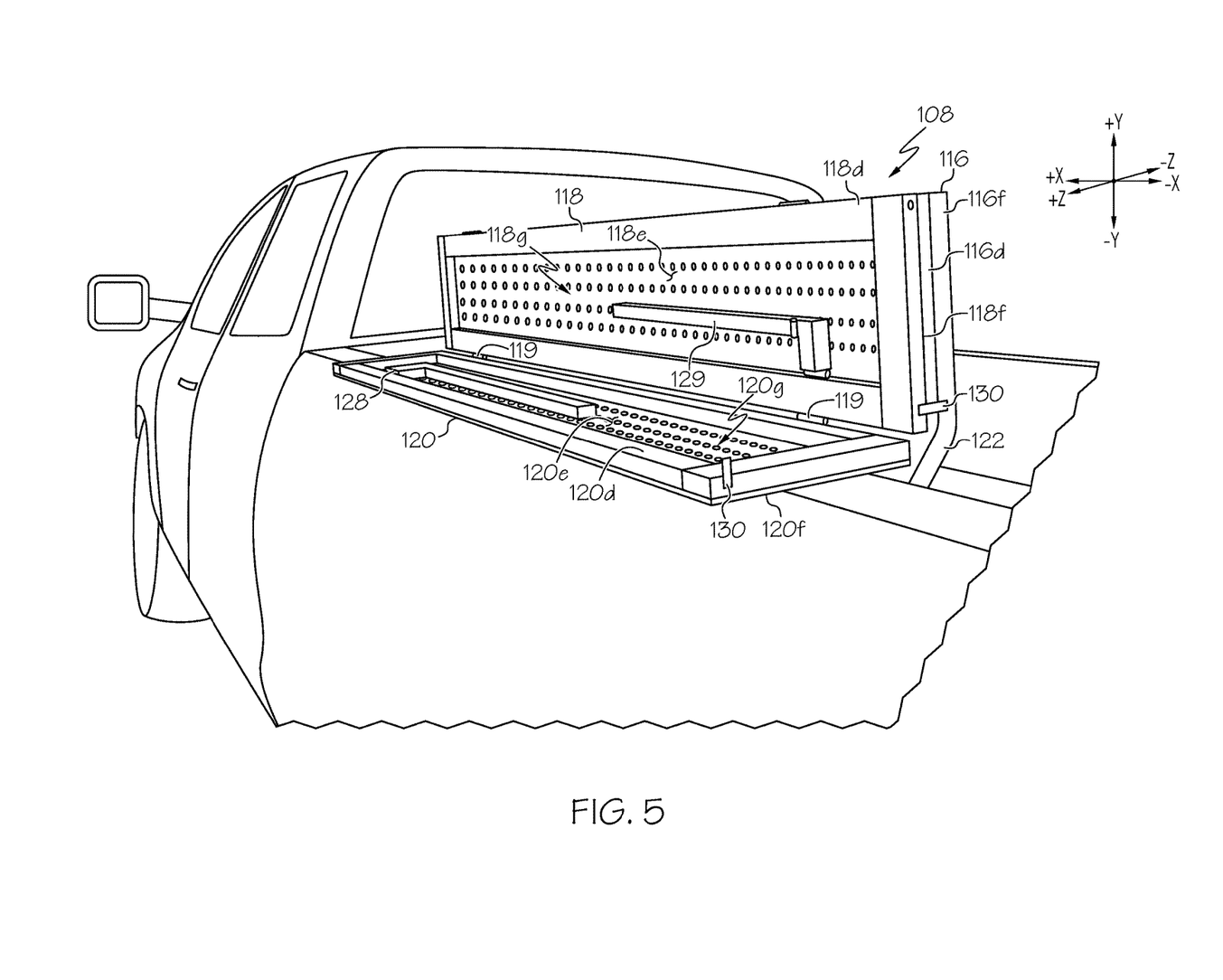
FIG. 5 schematically depicts a partial perspective view of an opposite side of the truck bed of FIG. 4 with the other of the pair of deck side extender assemblies in the raised position and with one of a plurality of hingedly connected panels in an open auxiliary storage container configuration, according to one or more embodiments shown and described herein.

Referring to FIG. 5, in some embodiments, each of the first panel 116, the second panel 118, and the third panel 120 may include a lip 116*d*, 118*d*, 120*d* that may extend outwardly from an inner surface 118*e*, 120*e* of each respective panel. The lip 116*d*, 118*d*, 120*d* may bound a perimeter 116*f*, 118*f*, 120*f* of the inner surface 118*e*, 120*e*. Each lip 116*d*, 118*d*, 120*d* may form a storage volume 118*g*, 120*g* adjacent its respective panel. As shown in FIG. 5, the first leg 128 and the second leg 129 may fold against the first deck side extender assembly 108 into a folded position such that the first deck side extender assembly 108 can close with the first leg 128 and the second leg 129 completely surrounded by the lip 118*d* and the lip 120*d* of the first deck side extender assembly 108.

In some embodiments, for example, the embodiment depicted in FIG. 5, the storage volumes of adjacent panels may be adjacent to one another. For example, as shown in FIG. 5, the storage volume 120*g* is adjacent the storage volume 118*g*. Thus, if the third panel 120 is folded upward such that the third panel 120 is substantially parallel with the second panel 118, the two storage volumes 118*g*, 120*g* will abut one another and form a storage volume that includes both storage volumes 118*g*, 120*g*. In some embodiments, the lip 118*d* and the lip 120*d* may substantially enclose the entire storage volume.

Each deck side extender assembly 108, 108' of the pair of deck side extender assemblies may include one or more lock mechanisms 130, 130'. Referring to FIG. 5, the lock mechanisms 130 may comprise, for example, a hasp, a bolt hasp, a hook and eye, or some other type of fastening mechanism. The lock mechanisms 130 may be moveable between a locked position and an unlocked position. In the locked position the lock mechanisms 130 may inhibit the second panel 118 from articulating independent of the first panel 116 and the third panel 120 from articulating independent of the second panel 118. In the unlocked position, the lock mechanism 130 may permit the second panel 118 to articulate independent of the first panel 116 and the third panel 120 to articulate independent of the second panel 118. Like the other features of the first deck side extender assembly 108, this feature may be mirrored on the right side of the pickup truck 10. That is, the second deck side extender assembly 108' may include one or more lock mechanisms 130' identical to the lock mechanisms 130.

Briefly referring to FIG. 4, in some embodiments, the lock mechanism 130' may prevent the second panel 118' from moving independent of the first panel 116' with the first panel 116' and the second panel 118' in a substantially flat plane. The lock mechanism 130' may prevent the third panel 120' from moving independent of the second panel 118' with the second panel 118' and the third panel 120' in a substantially flat plane. In such an embodiment, the lock mechanisms 130' may provide support for the substantially flat arrangement of the panels. That is, the lock mechanisms 130' may help to hold the panels upright in the vertical direction in addition to the first leg 128' and the second leg 129'. Like the other features of the second deck side extender assembly 108', this feature may be mirrored on the left side of the pickup truck 10.

Figure 6:
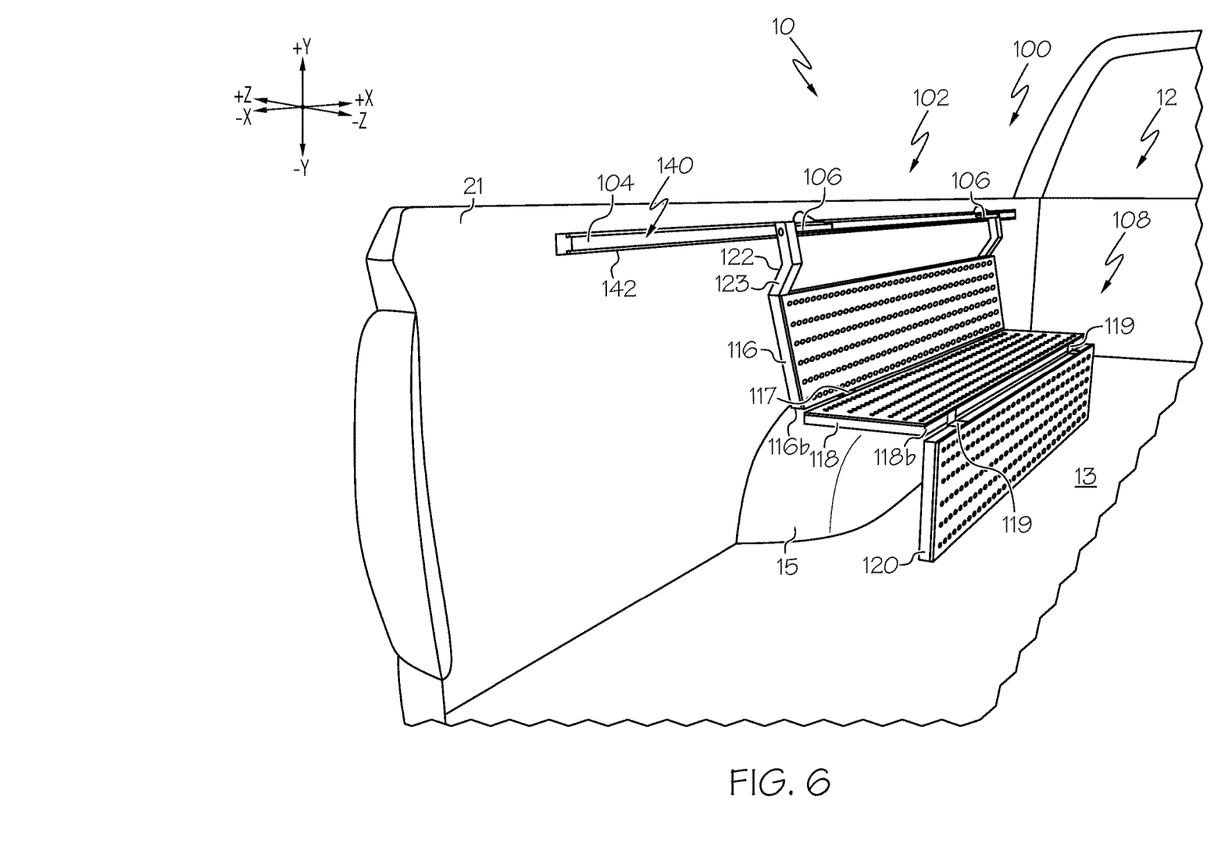
FIG. 6 schematically depicts a partial perspective view of the opposite side of the truck bed of FIG. 4 with the other of the pair of deck side extender assemblies in the lowered position with the plurality of hingedly connected panels in a seat position, according to one or more embodiments shown and described herein.

Referring now to FIG. 6, in some embodiments of the multi-panel deck side extender system 100, the deck side extender assembly 108 of the pair of deck side extender assemblies may be pivotally displaceable about the bracket 106 to a seat position. In the seat position, the first panel 116 may extend in the vehicle vertical direction, the second panel 118 may extend in the vehicle horizontal direction from the distal edge 116*b* of the first panel 116, and the third panel 120 may extend in the vehicle vertical direction from the distal edge 118*b* of the second panel 118. The second panel 118, specifically the lip 118*d*, is supported by a wheel well 15 of the truck bed 12. The third panel 120 may extend from the distal edge 118*b* of the second panel 118 such that the second panel 118 forms a seat configured to support an occupant. In some embodiments, the second panel 118 may be supported in the vehicle vertical direction by the third panel 120. That is, the third panel 120 may extend between the distal edge 118*b* of the second panel 118 and the floor 13 of the truck bed 12. Like the other features of the first deck side extender assembly 108, this feature may be mirrored on the right side of the pickup truck 10.

Figure 7:
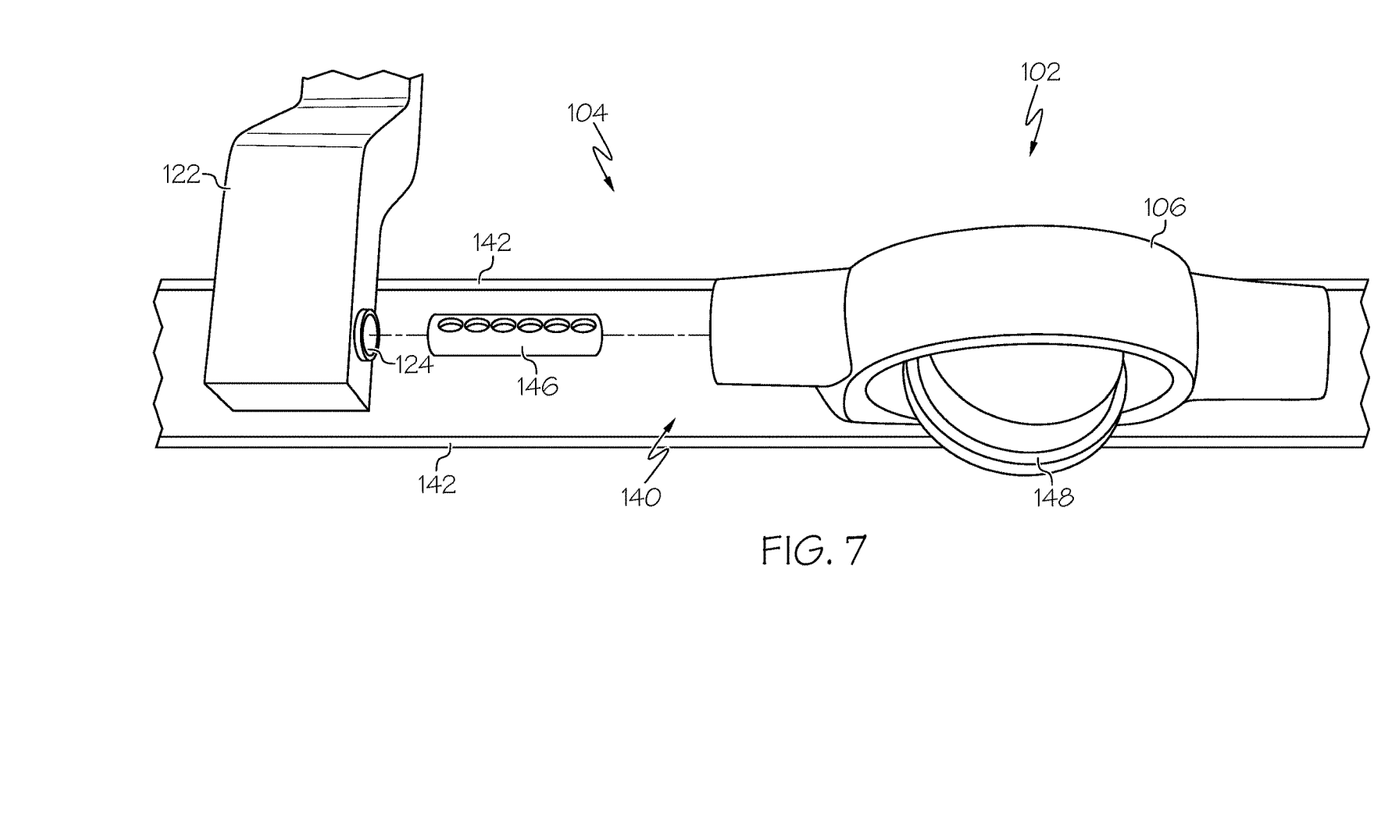
FIG. 7 schematically depicts an exploded side view of the deck rail assembly having a rail, a bracket, a pin, and an extension arm of a first panel of the plurality of hingedly connected panels of FIG. 1, according to one or more embodiments shown and described herein.

Referring now to FIGS. 6 and 7, each of the deck rail assembly 102 may include the rail 104. The rail 104 may generally extend in the vehicle longitudinal direction and include a groove 140 between two rails 142. The groove 140 may receive one or more accessories, such as the bracket 106. Example embodiments of the bracket 106 include a cleat or other type of fastening mechanism. In some embodiments, the groove 140 may extend substantially the entire length of the rail 104. In some embodiments, the rail 104 may extend substantially the entire length of the truck bed 12. The cleat 144 may include an adjustable friction connection that is adjustable using a knob 148. The knob 148 may be adjusted to increase the friction between the cleat 144 and the rail 104 to allow the movement of the cleat 144 relative to the rail 104 in the vehicle longitudinal direction in order to reposition the deck side extender assembly 108 in the vehicle longitudinal direction. Like the other features of the first deck side extender assembly 108, this feature may be mirrored on the right side of the pickup truck 10.

Referring to FIG. 7, the extension arm 122 may include an aperture 124 for connecting the extension arm 122 with the cleat 144 using a pin 146. The pin 146 may rotatably connect the extension arm 122, and thus the deck side extender assembly 108 to the rail 104. In some embodiments, the pin 146 may be removed from the aperture 124 by reducing the friction between the cleat 144 and the rail 104, moving the cleat 144 away from the extension arm 122 (or vice-a-versa) and pulling pin 146 out of the extension arm 122, the cleat 144, or both. In this way, the deck side extender assembly 108 may be removed from the interior surface 21 of the truck bed 12. Like the other features of the first deck side extender assembly 108, this feature may be mirrored on the right side of the pickup truck 10.

Figure 8:
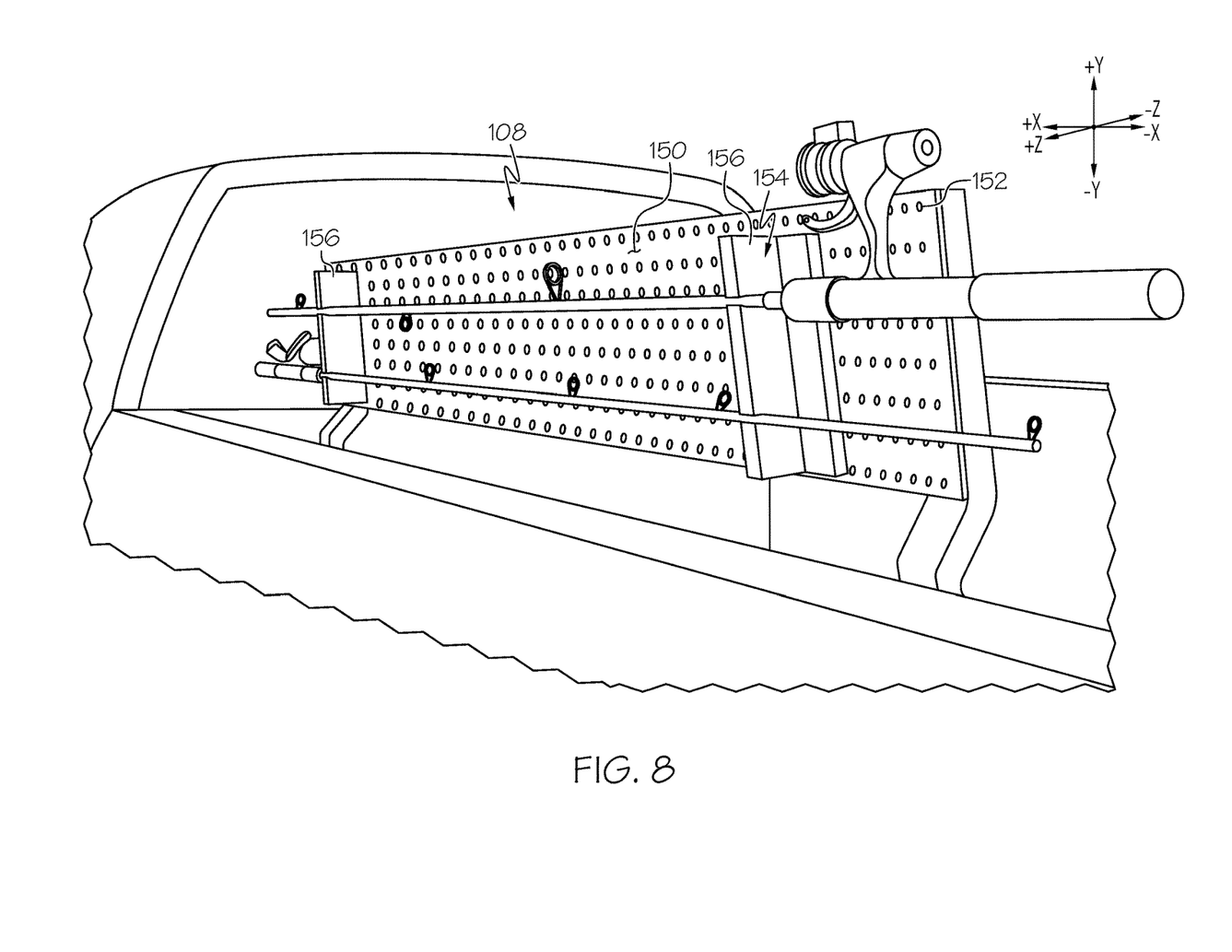
FIG. 8 schematically depicts a partial perspective view of the opposite side of the truck bed of FIG. 4 with a first accessory attachment feature installed, according to one or more embodiments shown and described herein.
Figure 9:
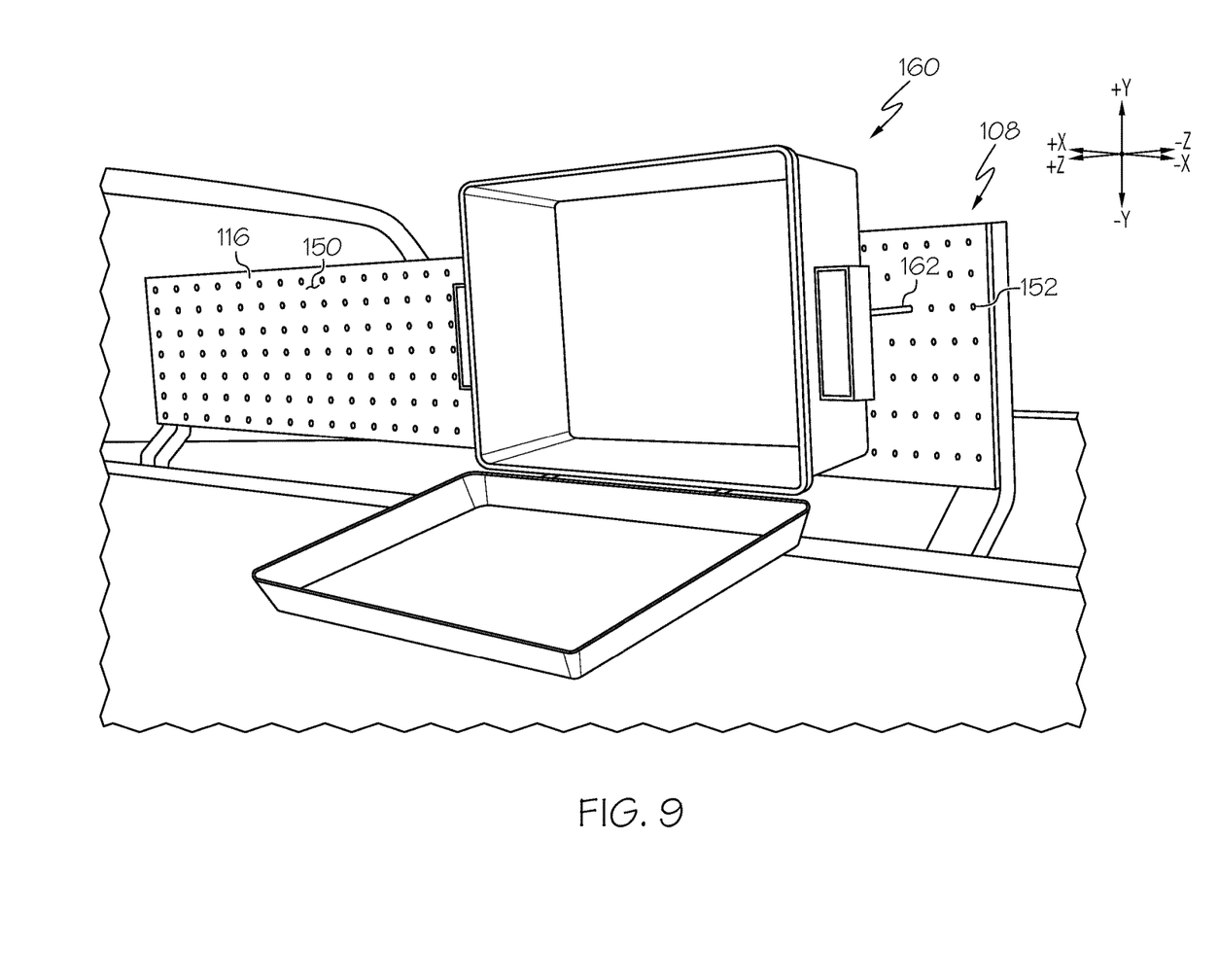
FIG. 9 schematically depicts a partial perspective view of the opposite side of the truck bed of FIG. 4 with a second accessory attachment feature installed, according to one or more embodiments shown and described herein.

As shown in FIGS. 8 and 9, one or more panels of the deck side extender assembly 108 may include a peg board surface 150. The peg board surface 150 may include a plurality of apertures 152 passing through or partially through the panel. The peg board surface 150 may be configured to work with one or more accessories having pegs or other structures that fit within the apertures 152 in the peg board surface 150. The accessories having pegs or other structures that fit within the apertures 152 may comprise one or more attachment features for attaching various types and numbers of accessories to the panels. For example, as shown in FIG. 8, the apertures 152 in the peg board surface 150 may receive connecting features from a fishing rod holding mechanism 154. The fishing rod holding mechanism 154 may comprise a pair of walls 156 that extend outward from the peg board surface 150 in the vehicle outward direction. Like the other features of the first deck side extender assembly 108, this feature may be mirrored on the right side of the pickup truck 10.

Referring now to FIG. 9, another feature adaptable with the deck side extender assembly 108 is shown. FIG. 9 depicts an auxiliary storage compartment 160 removably coupled to the peg board surface 150. The auxiliary storage compartment 160 may be moveable between an open and a closed position. The auxiliary storage compartment 160 may be removeably coupled to the peg board surface 150 using one or more bolts 162 that extend from the auxiliary storage compartment 160 into one or more of the apertures 152 in the peg board surface. Like the other features of the first deck side extender assembly 108, this feature may be mirrored on the right side of the pickup truck 10.

In some embodiments, the multi-panel deck side extender system 100 may be fitted with actuators, motors, transducers, or some other implementation for moving the multi-panel deck side extender system 100 between the various configurations without manual manipulation by a user. The actuator may be remotely or locally operated. For example, the actuator may be in wireless communication with a controller configured to send instructions to a receiver communicatively coupled with the actuator for receiving commands to operate the actuator mechanically coupled to the multi-panel deck side extender system 100. The receiver may store one or more machine-readable instructions or other instructions that may, when read by a computer or other processing device, cause the multi-panel deck side extender system 100 to shift between configurations, to open the storage area, to close the storage area, or to otherwise change a configuration of the multi-panel deck side extender system 100.

In some embodiments, the pickup truck 10 may be configured to operate the multi-panel deck side extender system 100 from within a cabin of the vehicle. For example, a center console of the pickup truck 10 may include one or more controls for changing a configuration of the multi-panel deck side extender system 100 automatically.

It should now be understood that a multi-panel deck side extender system may include a deck rail assembly and a pair of deck side extender assemblies. The deck side extender assemblies may include a plurality of independently articulable panels and be configured to pivot with respect to one another to configure the deck side extender assembly in a plurality of various configurations depending on a user preference. The multi-panel deck side extender system may increase the storage capacity and adaptability of the truck bed and thus the breadth of a user experience with the pickup truck.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multi-panel deck side extender system for a pickup truck having a truck bed that includes a floor and a pair of spaced apart sidewalls, each of the pair of spaced apart sidewalls includes an upper surface, an exterior surface and an opposite interior surface, the multi-panel deck side extender system comprising:
   a deck rail assembly having a pair of rails that extend in a vehicle longitudinal direction and at least one bracket slidably connected to each rail of the pair of rails, each of the pair of rails are secured to the interior surfaces of the pair of sidewalls; and
   a pair of deck side extender assemblies, each of the pair of deck side extender assemblies pivotally connected to the at least one bracket such that each of the pair of deck side extender assemblies is slidably displaceable in the vehicle longitudinal direction with respect to the pair of rails, each of the pair of deck side extender assemblies are pivotally displaceable about the at least one bracket between a lowered position and a raised position, in the lowered position the pair of deck side extender assemblies are positioned below the upper surfaces of the pair of sidewalls, in a vehicle vertical direction and adjacent the interior surfaces of the pair of sidewalls in a vehicle lateral direction, and in the raised position the pair of deck side extender assemblies are positioned above the upper surfaces of the pair of sidewalls in the vehicle vertical direction.

2. The multi-panel deck side extender system of claim 1, wherein each of the pair of deck side extender assemblies includes a plurality of hingedly connected panels that are configured to articulate individually.

3. The multi-panel deck side extender system of claim 2, wherein in the lowered position the plurality of hingedly connected panels are folded to stack upon each adjacent panel to form a stack of folded panels and in which the stack of folded panels is positioned within the truck bed adjacent to the interior surface of the sidewalls of the truck bed.

4. The multi-panel deck side extender system of claim 3, wherein the plurality of hingedly connected panels includes an extension arm, a first panel, and a second panel, each of the first panel and the second panel includes a proximal edge and a distal edge, one end of the extension arm is pivotally connected to the at least one bracket and an opposite end of the extension arm is connected to the proximal edge of the first panel, the distal edge of the first panel is hingedly connected to the proximal edge of the second panel such that the second panel is articulable independent of the first panel.

5. The multi-panel deck side extender system of claim 4, wherein the plurality of panels includes a third panel that includes a proximal edge and a distal edge, the proximal edge of the third panel is hingedly connected to the distal edge of the second panel such that the third panel is articulable independent of the second panel.

6. The multi-panel deck side extender system of claim 5, wherein each of the pair of deck side extender assemblies are pivotally displaceable about the at least one bracket to an intermediate position between the raised position and the lowered position, in the intermediate position an outer surface of the first panel, an outer surface of the second panel, and an outer surface of the third panel extend in a substantially flat plane in the vehicle lateral direction and the vehicle longitudinal direction.

7. The multi-panel deck side extender of claim 6, wherein at least one of the first panel, the second panel, and the third panel includes a leg that extends between the substantially flat plane and the floor to support the first panel, the second panel, and the third panel in the intermediate position.

8. The multi-panel deck side extender of claim 7, wherein each of the first panel, the second panel, and the third panel includes a lip extending outwardly from an inner surface opposite the outer surface, the lip bounds a perimeter of the inner surface of the first panel, the second panel, and the third panel, and each lip forms a storage volume adjacent its respective panel.

9. The multi-panel deck side extender of claim 7, wherein each of the pair of deck side extender assemblies includes a lock mechanism that is moveable between a locked position and an unlocked position, in the locked position the lock mechanism inhibits the second panel and the third panel from articulating independent of the first panel, and in the unlocked position the lock mechanism permits the second panel and the third panel to articulate independently from the first panel.

10. The multi-panel deck side extender of claim 5, wherein each of the pair of deck side extender assemblies are pivotally displaceable about the at least one bracket to a seat position, in the seat position the first panel extends in the vehicle vertical direction, the second panel extends in a vehicle horizontal direction from the first panel, and the third panel extends in the vehicle vertical direction such that the second panel forms a seat configured to support an occupant.

11. A truck bed deck side extender assembly comprising:
a truck bed that includes a floor and a pair of spaced apart sidewalls, each of the pair of spaced apart sidewalls includes an upper surface, an exterior surface and an opposite interior surface;
a deck rail assembly having a pair of rails that extend in a vehicle longitudinal direction and at least one bracket slidably connected to each of the pair of rails, each of the pair of rails are secured to the interior surfaces of the pair of sidewalls; and
a pair of deck side extender assemblies, each of the pair of deck side extender assemblies pivotally connected to the at least one bracket such that each of the pair of deck side extender assemblies is slidably displaceable in the vehicle longitudinal direction with respect to the pair of rails, each of the pair of deck side extender assemblies includes a plurality of hingedly connected panels that are configured to articulate individually, each of the pair of deck side extender assemblies are pivotally displaceable about the at least one bracket between a lowered position and a raised position, in the lowered position the plurality of panels are positioned below the upper surface of the pair of sidewalls, in a vehicle vertical direction and adjacent the interior surfaces of the pair of sidewalls in a vehicle lateral direction, and in the raised position the plurality of panels are positioned above the upper surfaces of the pair of sidewalls in the vehicle vertical direction.

12. The truck bed deck side extender assembly of claim 11, wherein in the lowered position the plurality of hingedly connected panels are folded to stack upon each adjacent panel to form a stack of folded panels and in which the stack of folded panels is positioned within the truck bed adjacent to the interior surface of the sidewalls of the truck bed.

13. The truck bed deck side extender assembly of claim of claim 12, wherein the plurality of hingedly connected panels includes an extension arm, a first panel, and a second panel, each of the first panel and the second panel includes a proximal edge and a distal edge, one end of the extension arm is pivotally connected to the at least one bracket and an opposite end of the extension arm is connected to the proximal edge of the first panel, the distal edge of the first panel is hingedly connected to the proximal edge of the second panel such that the second panel is articulable independent of the first panel.

14. The truck bed deck side extender assembly of claim 13, wherein the plurality of panels includes a third panel that includes a proximal edge and a distal edge, the proximal edge of the third panel is hingedly connected to the distal edge of the second panel such that the third panel is articulable independent of the second panel.

15. The truck bed deck side extender assembly of claim 14, wherein each of the pair of deck side extender assemblies are pivotally displaceable about the at least one bracket to an intermediate position between the raised position and the lowered position, in the intermediate position an outer surface of the first panel, an outer surface of the second panel, and an outer surface of the third panel extend in a substantially flat plane in the vehicle lateral direction and the vehicle longitudinal direction.

16. The truck bed deck side extender assembly of claim 15, wherein at least one of the first panel, the second panel, and the third panel includes a leg that extends between the substantially flat plane and the floor to support the first panel, the second panel, and the third panel in the intermediate position.

17. The truck bed deck side extender assembly of claim 16, wherein each of the first panel, the second panel, and the third panel includes a lip extending outwardly from an inner surface opposite the outer surface, the lip bounds a perimeter of the inner surface of the first panel, the second panel, and the third panel, and each lip forms a storage volume adjacent its respective panel.

18. A method of increasing the storage capacity of a truck bed of a pickup truck, the method comprising:
providing a truck bed that includes a floor and a pair of spaced apart sidewalls, each of the pair of spaced apart sidewalls including an upper surface, an exterior surface and an opposite interior surface;
providing a deck rail assembly having a pair of rails that extend in a vehicle longitudinal direction and at least one bracket slidably connected to each of the pair of rails, each of the pair of rails are secured to the interior surfaces of the pair of sidewalls;
providing a pair of deck side extender assemblies, each of the pair of deck side extender assemblies pivotally connected to the at least one bracket such that each of the pair of deck side extender assemblies is slidably displaceable in the vehicle longitudinal direction with respect to the pair of rails, each of the pair of deck side extender assemblies including a plurality of hingedly connected panels that are configured to articulate individually, each of the pair of deck side extender assemblies are pivotally displaceable about the at least one bracket between a lowered position and a raised position, in the lowered position the plurality of panels are positioned below the upper surface of the pair of sidewalls, in a vehicle vertical direction and adjacent the interior surfaces of the pair of sidewalls in a vehicle lateral direction, and in the raised position the plurality of panels are positioned above the upper surfaces of the pair of sidewalls in the vehicle vertical direction; and
storing one or more items on one or more of each of the pair of deck side extender assemblies.

19. The method of claim 18, wherein the plurality of hingedly connected panels further includes an extension arm, a first panel, and a second panel, and each of the first panel and the second panel includes a proximal edge and a distal edge, one end of the extension arm is pivotally connected to the at least one bracket and an opposite end of the extension arm is connected to the proximal edge of the first panel, and the distal edge of the first panel is hingedly connected to the proximal edge of the second panel such that the second panel is articulable independent of the first panel, the method further comprising storing one or more items between the first panel and the second panel.

20. The method of claim 19, wherein the plurality of hingedly connected panels further includes a third panel configured to rotate independent of the second panel at a distal end of the second panel and a proximal end of the third panel, the method further comprising storing one or more items between the third panel and the second panel.

\* \* \* \* \*

UNITED STATES PATENT AND TRADEMARK OFFICE
CERTIFICATE OF CORRECTION

PATENT NO.        : 10,435,082 B1
APPLICATION NO.   : 15/995746
DATED             : October 8, 2019
INVENTOR(S)       : Robert K. Kupina and Todd M. Bello Page 1 of 1

It is certified that error appears in the above-identified patent and that said Letters Patent is hereby corrected as shown below:

In the Claims

In Column 11, Claim 13, Line 61, delete "of claim"

Signed and Sealed this
Third Day of December, 2019

Andrei Iancu
*Director of the United States Patent and Trademark Office*